A. REEDER.
Plow-Cleaner.

No. 20,300.

Patented May 18, 1858.

UNITED STATES PATENT OFFICE.

A. REEDER, OF WRIGHTSTOWN, PENNSYLVANIA.

IMPROVEMENT IN APPARATUS FOR CLEARING THE COLTERS OF PLOWS.

Specification forming part of Letters Patent No. 20,300, dated May 18, 1858.

*To all whom it may concern:*

Be it known that I, ABNER REEDER, of Wrightstown, Bucks county, State of Pennsylvania, have invented an Improvement in Apparatus for Clearing the Colters of Plows; and I do hereby declare the following to be a full, clear, and exact description of the same, reference being had to the accompanying drawings, and to the letters of reference marked thereon.

My improvement consists in a spring sliding rod, furnished at one end with any convenient number of prongs, and so connected to and arranged on a plow that the plowman can at once clear the colter from accumulated soil, and thus dispense with the extra assistant frequently required for the purpose.

In order to enable others skilled in the art to make and use my invention, I will now proceed to describe its construction and operation.

Figure 1:
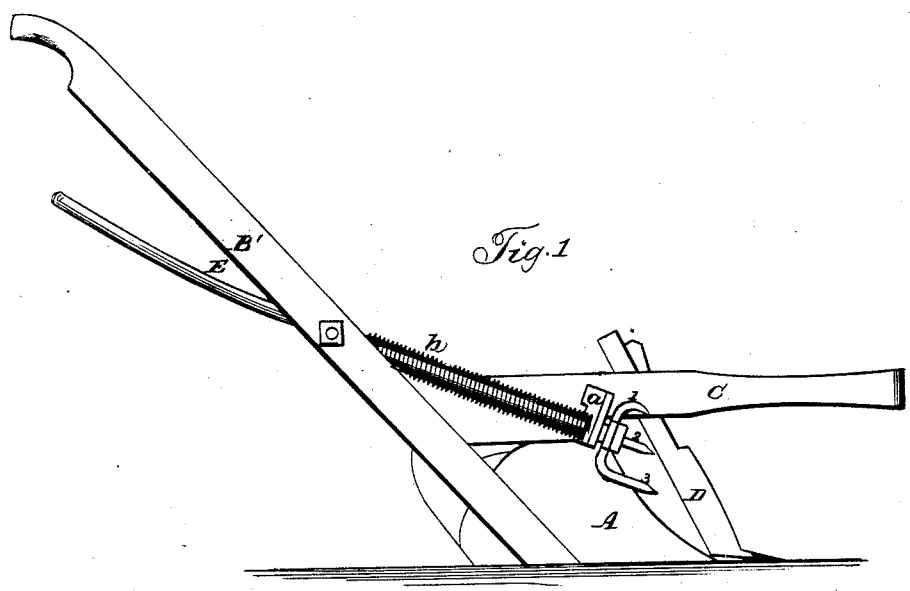
Figure 2:
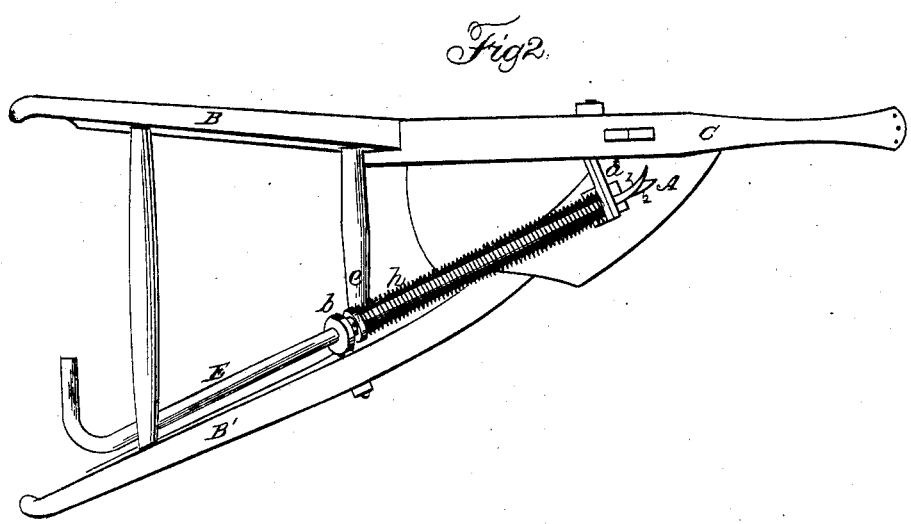

On reference to the accompanying drawings, which form a part of this specification, Figure 1 is a side view of an ordinary plow, illustrating my improved mode of clearing the colter; Fig. 2, a ground plan of the same.

A is the share of the plow. B and B' are the handles. C is the beam, and D the colter, all of which may be of the usual form and construction.

To the beam C, I secure a bracket, *a*, and to one of the handles, B', another bracket, *b*. Through orifices in the brackets passes the rod E, the orifice in the lower bracket, *b*, being square for receiving the square portion of the rod, which is thus prevented from turning. The upper end of the rod is bent so as to form a handle, which is so situated as to be under the control of the plowman. A spiral spring, *h*, surrounds the rod E, and bears at one end against a collar, *e*, on the latter, and at the other end against the bracket *a*, so as to maintain the rod in the position shown in the drawings when not disturbed by pressing on the upper end. The lower end of the rod is furnished with three prongs, 1, 2, and 3, so arranged that when the rod is forced downward the upper prong, 1, shall pass beneath the beam in front of and at an angle with the colter, near the point where the latter is secured to the beam, the other prongs, 2 and 3, passing also at an angle to and near the front edge of the colter.

In plowing the soil, especially if it be of a clayey nature, is apt to accumulate near the upper end of the colter and beneath the beam to such an inconvenient extent that the plowshare cannot penetrate the soil to the required depth—an evil usually remedied by the employment of an extra laborer to clear the colter.

The above-described contrivance has been designed for the purpose of avoiding this extra trouble and expense. When the plowman finds that the colter has become clogged he removes his hand from the handle B' of the plow, and placing it on the bent end of the rod E forces the latter downward until the prongs pass in front of the colter and clear away the accumulated soil. When the plowman releases the rod the spiral spring *h* forces it back to its original position.

Without claiming broadly an apparatus under the control of the plowman for clearing the colters of plows, or the employment of a spring in connection with such apparatus, I claim and desire to secure by Letters Patent—

The spring sliding rod E with any convenient number of prongs, when connected to and arranged on the plow, as and for the purpose herein set forth.

In testimony whereof I have signed my name to this specification before two subscribing witnesses.

ABNER REEDER.

Witnesses:
HENRY HOWSON,
HENRY ODIORNE.